US009751986B2

(12) United States Patent
Sidenstick et al.

(10) Patent No.: US 9,751,986 B2
(45) Date of Patent: *Sep. 5, 2017

(54) LOW TOXICITY SOLVENT SYSTEM FOR POLYAMIDEIMIDE RESINS AND SOLVENT SYSTEM MANUFACTURE

(71) Applicant: FUJIFILM Hunt Chemicals U.S.A., Inc., Allendale, NJ (US)

(72) Inventors: John Sidenstick, Newport, TN (US); David Noga, Spring City, TN (US); Kathryn Mullins, Soddy Daisy, TN (US); Mace Phillips, Hixson, TN (US)

(73) Assignee: FUJIFILM HUNT CHEMICALS US, INC., Allendale, NJ (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/365,459

(22) PCT Filed: Dec. 17, 2012

(86) PCT No.: PCT/US2012/070192
§ 371 (c)(1),
(2) Date: Jun. 13, 2014

(87) PCT Pub. No.: WO2013/090933
PCT Pub. Date: Jun. 20, 2013

(65) Prior Publication Data
US 2016/0002408 A1 Jan. 7, 2016

Related U.S. Application Data

(60) Provisional application No. 61/576,247, filed on Dec. 15, 2011.

(51) Int. Cl.
| C08G 73/14 | (2006.01) |
| C08G 73/10 | (2006.01) |
| C09D 7/00 | (2006.01) |
| C09D 179/08 | (2006.01) |
| C08L 79/08 | (2006.01) |

(52) U.S. Cl.
CPC ......... C08G 73/14 (2013.01); C08G 73/1003 (2013.01); C09D 7/001 (2013.01); C09D 179/08 (2013.01); C08L 79/08 (2013.01)

(58) Field of Classification Search
CPC ....... C08L 79/08; C09D 179/08; H01B 3/306; C08G 73/14; C08G 73/1003
See application file for complete search history.

(56) References Cited

U.S. PATENT DOCUMENTS

| 3,346,502 A | 10/1967 | Harold |
| 3,393,153 A | 7/1968 | Zimmerer et al. |
| 3,463,764 A | 8/1969 | Hopwood et al. |
| 3,646,015 A | 2/1972 | Hamilton |
| 3,650,752 A | 3/1972 | Amano et al. |
| 3,666,470 A | 5/1972 | Tsuji et al. |
| 3,779,766 A | 12/1973 | Tsuji et al. |
| 3,790,530 A | 2/1974 | Koerner et al. |
| 3,843,587 A | 10/1974 | Keating et al. |
| 3,939,109 A | 2/1976 | Barie, Jr. et al. |
| 3,975,345 A * | 8/1976 | Fessler ............... C08G 18/3821 204/493 |
| 4,003,947 A | 1/1977 | Peterson |
| 4,003,974 A | 1/1977 | Chantry et al. |
| 4,098,775 A | 7/1978 | Onder |
| 4,189,518 A * | 2/1980 | Peterson ............ C08G 73/1007 427/120 |
| 4,408,032 A | 10/1983 | Sollner et al. |
| 4,428,978 A | 1/1984 | Jabs et al. |
| 4,497,944 A | 2/1985 | Nishizawa et al. |
| 4,950,700 A | 8/1990 | Balme et al. |
| 4,981,769 A | 1/1991 | Saeki et al. |
| 4,999,333 A | 3/1991 | Usami et al. |
| 5,002,924 A | 3/1991 | Seitz |
| 5,035,974 A | 7/1991 | Saeki et al. |
| 5,051,333 A | 9/1991 | Yanagihara et al. |
| 5,103,326 A | 4/1992 | Fergason |
| 5,231,117 A | 7/1993 | Seitz |
| 5,368,973 A | 11/1994 | Hasegawa |
| 5,756,647 A | 5/1998 | Schmid et al. |
| 5,948,607 A | 9/1999 | Uchida et al. |
| 6,265,128 B1 | 7/2001 | Hare et al. |
| 6,319,291 B1 | 11/2001 | Pedemonte |
| 6,340,550 B2 | 1/2002 | Hare et al. |
| 6,849,385 B2 | 2/2005 | Nagoya et al. |
| 7,011,922 B2 | 3/2006 | Minami et al. |
| 7,410,744 B2 | 8/2008 | Watanabe et al. |
| 9,029,441 B2 * | 5/2015 | Sidenstick et al. .... C08G 73/14 524/100 |
| 2001/0003730 A1 | 6/2001 | Suzuki et al. |
| 2001/0044553 A1 | 11/2001 | Kabashima et al. |
| 2003/0060387 A1 | 3/2003 | Hsu et al. |
| 2005/0043502 A1 | 2/2005 | Hikita et al. |
| 2007/0042907 A1 | 2/2007 | Nagasawa et al. |
| 2007/0098900 A1 | 5/2007 | Abe et al. |
| 2007/0254138 A1 | 11/2007 | Remmer |
| 2009/0208868 A1 | 8/2009 | Okazaki et al. |
| 2012/0065296 A1 | 3/2012 | Fujimoto |

FOREIGN PATENT DOCUMENTS

| CN | 101218540 | 7/2008 |
| EP | 0587410 | 3/1994 |

(Continued)

OTHER PUBLICATIONS

International Search Report and Written Opinion, PCT Application No. PCT/US2015/26255, mailed on Jul. 8, 2015, 8 pages.

(Continued)

Primary Examiner — Gregory Listvoyb
(74) Attorney, Agent, or Firm — Blakely, Sokoloff, Taylor & Zafman LLP

(57) ABSTRACT

Disclosed is a low toxicity aprotic alkyl amide solvent system used for the manufacture and application of polyamideimide resins, and an efficient method for manufacturing the polyamideimide resins in a solvent system in a single reaction with distillation which allows recycling of intermediate streams. The solvent system can be used for either the manufacture or the dissolution of polyamideimide resins.

13 Claims, No Drawings

(56) References Cited

FOREIGN PATENT DOCUMENTS

| JP | S46-043896 | 1/1972 |
|---|---|---|
| JP | S49-052299 | 5/1974 |
| JP | S55-120628 | 9/1980 |
| JP | S58-080326 | 5/1983 |
| JP | 62202783 | 9/1987 |
| JP | S63-210120 | 8/1988 |
| JP | 2003145945 | 5/2003 |
| JP | 2007-099891 | 4/2007 |
| JP | 2011231278 | 11/2011 |
| WO | WO-2002078970 | 10/2002 |
| WO | WO-2007014847 | 2/2007 |
| WO | WO-2013090933 | 6/2013 |

OTHER PUBLICATIONS

Non-Final Office Action for U.S. Appl. No. 14/687,771, mailed on Dec. 14, 2015, 10 pages.
International Search Report and Opinion for PCT Application No. PCT/US2015/026224, mailed Jul. 8, 2015, 8 pages.
Non-Final Office Action for U.S. Appl. No. 14/365,459 mailed Dec. 9, 2015, 9 pages.
First Office Action for Chinese Patent Application No. 201280061393.6 (+English Translation), mailed on Aug. 6, 2015, 16 pages.
Second Office Action for Chinese Patent Application No. 201280061393.6 (+English Translation), mailed on Feb. 22, 2016, 7 pages.
European Search Report for European Patent Application No. 12 85 8583), mailed on Jun. 18, 2015, 6 pages.
International Search Results and Written Opinion for PCT Application No. PCT/US2012/070192, mailed on Mar. 29, 2013, 7 pages.
International Preliminary Report for PCT Application No. PCT/US2012/070192, mailed on Nov. 24, 2014, 11 pages.
Written Opinion from Singapore Patent Application No. 11201403244W mailed on Sep. 3, 2015, 11 pages.
Non-Final Office Action in U.S. Appl. No. 13/842,697 mailed on Jul. 30, 2014, 7 pages.
International Search Report and Written Opinion for PCT Application No. PCT/US2014/015610, mailed on May 12, 2014, 8 pages.
International Preliminary Report for PCT Application No. PCT/US2014/015610, mailed on Sep. 15, 2015, 7 pages.
International Preliminary Report on Patentability from PCT/US2014/014949 mailed Aug. 11, 2015, 8 pages.
International Search Report and Written Opinion for PCT Application No. PCT/US2014/014949, mailed on May 7, 2014, 11 pages.
Non-Final Office Action form U.S. Appl. No. 13/761,051 mailed Jun. 18, 2014, 8 pages.
Non-Final Office Action for U.S. Appl. No. 14/687,776 mailed Dec. 9, 2015, 9 pages.
Final Office Action for U.S. Appl. No. 13/761,051 mailed Jan. 2, 2015, 6 pages.
Second Non-Final Office Action U.S. Appl. No. 13/761,051 mailed Sep. 2, 2015, 8 pages.
Final Office Action for U.S. Appl. No. 13/761,051, mailed on Mar. 1, 2016, 12 pages.
Non-Final Office Action for U.S. Appl. No. 13/353,095 mailed on Apr. 17, 2013, 9 pages.
Final Office Action for U.S. Appl. No. 13/353,095 mailed on Dec. 9, 2013, 9 pages.
International Preliminary Report on Patentability from PCT Application No. PCT/US2012/021752, mailed on Jul. 22, 2014, 8 pages.
International Search Report and Written Opinion for PCT Application No. PCT/US2012/021752, mailed Apr. 19, 2012, 11 pages.
Examination Report from Singapore Patent Application No. 11201403244W, dated Feb. 22, 2016, 11 pages.
International Search Report for International Application No. PCT/US2012/070192, filed Dec. 17, 2012, mailed Mar. 29, 2013, 2 pages.
Written Opinion of the International Searching Authority for International Application No. PCT/US2012/070192, filed Dec. 17, 2012, mailed Mar. 29, 2013, 5 pages.
International Search Report for International Application No. PCT/US2012/070192, filed Dec. 17, 2012, dated Mar. 29, 2013, 2 pages.
Written Opinion of the International Searching Authority for International Application No. PCT/US2012/070192, filed Dec. 17, 2012, dated Mar. 29, 2013, 5 pages.
Office Action for Japanese Patent Application No. 2014-547554, dated Sep. 6, 2016, 11 pgs.
European Search Report from EP 14770839.0 dated Sep. 14, 2016, 9 pgs.
Non-Final Office Action from U.S. Appl. No. 14/687,776 dated Sep. 8, 2016, 11 pgs.
International Preliminary Report on Patentability from PCT/US2015/026255 dated Oct. 18, 2016, 7 pgs.
International Preliminary Report on Patentability from PCT/US2015/026224 dated Oct. 18, 2016, 7 pgs.
Office Action for European Patent Application No. 12858583.3, dated Oct. 19, 2016, 4 pgs.
Office Action for Chinese Patent Application No. 201280061393.6, dated Oct. 8, 2016, 14 pgs.).
Notice of Allowance from U.S. Appl. No. 14/687,771 dated Nov. 7, 2016, 15 pgs.
Notice of Allowance from U.S. Patent Application No. 14/687,771 dated Dec. 28, 2016, 5 pgs.
Fourth Office Action from Chinese Patent Application No. 201280061393.6 dated Mar. 27, 2017, 12 pgs.

* cited by examiner

LOW TOXICITY SOLVENT SYSTEM FOR POLYAMIDEIMIDE RESINS AND SOLVENT SYSTEM MANUFACTURE

PRIORITY

The present patent application is a U.S. National Phase Application under 35 U.S.C. §371 of International Application No. PCT/US2012/070192, filed Dec. 17, 2012, entitled LOW TOXICITY SOLVENT SYSTEM FOR POLYAMIDEIMIDE RESINS AND SOLVENT SYSTEM MANUFACTURE, which claims priority to and incorporates by reference the corresponding provisional patent application Ser. No. 61/576,247, titled, "Low Toxicity Solvent System for Polyamideimide Resins and Solvent System Manufacture," filed on Dec. 15, 2011.

FIELD OF THE INVENTION

Embodiments of the present invention relate to the field of solvents; more particularly, embodiments of the present invention relate to solvents and their use in producing polyamideimide.

BACKGROUND OF THE INVENTION

Polyamideimide (PAI) polymers are used for many high performance coating applications due to their excellent temperature resistance and high strength. The primary route to synthesizing polyamideimide polymers in a form that is convenient for the manufacture of coatings is by reacting diisocyanate, often 4,4'-methylene diphenyldiisocyanate (MDI) with trimellitic anhydride (TMA). In this process, PAI polymers are typically synthesized in polar aprotic solvents such as N-methyl amide compounds including dimethylformamide, dimethylacetamide, N-methylpyrrolidone (NMP), N-ethylpyrrolidone. See for example U.S. Pat. Nos. 2,421,021; 3,260,691; 3,471,444; 3,518,230; 3,817,926; and 3,847,878. The typical polymer solids level achieved in this synthetic route is 35-45% which may be diluted further with diluents depending on the end-use coating application.

Alternate solvents such as tetrahydrofuran, methyl ethyl ketone, gamma-butyrolactone, or dimethyl sulfoxide have drawbacks such as too low a boiling point for use as reaction solvent, low polymer solubility, or poor storage stability, which may change the application performance of the polymer resin.

U.S. Pat. Nos. 4,950,700 and 5,095,070 recite examples of gamma-butyrolactone with N-methylamide co-solvents and dimethylol ethylene urea as replacement solvents to synthesize PAI resin. However gamma-butyrolactone has neurological properties that make it subject to regulation and unsuitable for general use in formulations. Dimethylol ethylene urea has not had extensive toxicological studies performed and contains an N-methylamide functionality suspected of negative environmental and health impacts. New solvents, such as those described in U.S. Patent Application Publication No. 20100076223A1, for example 3-methoxy-N,N-dimethylpropionamide, may be too expensive or have not been fully tested for long term toxicity.

In addition, protic solvents such as ethyl lactate and propylene glycol are not suitable for use as PAI reaction media.

On a practical level, these solvents known in the art, while they may be useful for manufacturing PAI or effective for other organic synthetic reactions, are also recognized for having toxicity concerns. Thus it is an advantage to produce polyamideimide polymers using a synthetic method with minimal health and safety impact.

SUMMARY OF THE INVENTION

A process for producing polyamideimide is disclosed. In one embodiment, the process comprises using at least one aprotic dialkylamide solvent.

DETAILED DESCRIPTION OF THE PRESENT INVENTION

In an effort to achieve safer alternatives, in particular a synthesis route free of the commonly-used N-methyl amide solvents, alternative lower toxicity solvents are necessary. Acetamides are of interest due to their relatively low toxicity and easy preparation from industrially available dialkyl amines, with a long history of low chronic toxicity. In particular, dialkylamides are useful. N-acetyl morpholine (NAM), which is a solvent of low toxicity has been found to be suitable for use in making polyamideimde resins. Other useful and low toxicity solvents of the invention are diethyl acetamide (DEAc), di-n-propyl acetamide, N-formyl morpholine, diacetylpiperazine, N,N-diisopropylacetamide (DIPAc), di-n-butylacetamide (DIBAc), di-n-propylacetamide (DIPA), and N-propionyl morpholine (NPM). To achieve a lower toxicity process, it has now been found that the synthesis of PAI can be accomplished by the use of aprotic dialkylamide solvents of the invention, either alone, in combination with each other, or with the use of a co-solvent to provide a unique solvent system. The use of a combination of solvents may be required, for example for various industrial applications of PAI, where a viscosity within a specific range is desired. These solvents then can also act as diluents. To achieve this, a combination of dialkylamide solvents may be used to obtain the desired viscosity. Other preferred co-solvents of low toxicity that can be used either for the synthesis of, or as diluents for dissolution of, PAI resin are: water, o-xylene, triethylamine, dimethylethanolamine, morpholine, N-methylmorpholine, acetone, trimethylamine, tripropylamine, diethylamine, diisopropylamine, and caprolactam.

It has also been found that a further advantage of embodiments of the invention is that, by using one or more aprotic dialkylamides in the synthetic process, a single pot, two-step reaction is possible.

Further, use of prior art solvents for synthesis of PAI resin, such as N-methyl amides, is avoided due to the toxicity of these compounds Specifically, the preferred molar ratios of aprotic dialkylamide to other process co-solvents are from about 19:1 to about 1:1. More preferred is a ratio of from about 80:20 to about 70:30. Most preferred is a ratio of about 78:22.

EXAMPLES

Example 1

Method to Synthesize Co-Solvent System

To a 1 L 4-neck flask equipped with thermometer, condenser, and mechanical stirring, add 200 g diethylamine. Add 279.16 g acetic anhydride while keeping the temperature below 55° C. This is followed by the addition of 250.15 g morpholine. The reaction is heated to ~130° C. until the acetic acid is consumed (~8 h). Conversion is enhanced by the distillation of water/excess morpholine.

Example 2

(KM-1145): Charge 51 g. N-acetyl morpholine (NAM), 0.85 g. caprolactam, 19.8 g. MDI, 15.65 g. TMA and heat to 100° C. In solution at 96° C., hold 1.5 hours. Temperature reduced to 70° C. overnight, then heated to 130° C. for 1.25 hrs. Viscosity too high; add 12.2 g. NAM co-solvent from Example 1.

% Solids=33.82%, Viscosity (DVII, 23° C.)=63,000 cps.

Example 3

(JES-3-29): Charge 1.68 g. caprolactam, 31.49 g. TMA, 39.66 g. MDI and 102.12 g. NAM co-solvent from Example 1 and heat to 110° C. over 1.5 hours. Heat to 130° C. and monitor viscosity until it is >2,000 cps/120° C. (~7 hours). Cool to <80° C., add NAM co-solvent from Example 1 to maintain stirring. Add TEA slowly keeping temperature under 90° C. Hold >60° C. for 1-2 hours. Add water to adjust to ~28% solids. Heat and hold at 85° C. and adjust pH >8 with TEA and water as needed to achieve homogeneity.

Example 4

(KM277): A 250 mL round bottom flask equipped with mechanical stirrer, condenser, and nitrogen bubbler was charged with: 57.6 g n-acetyl morpholine, 18.9 g o-xylene, 1.3 g caprolactam, 29.7 g methylene diphenyl diisocyanate, and 23.5 g trimellitic anhydride. The reaction was heated to 90° C. for 2 hours. The reaction temperature was then heated to 130° C. for 5 hours and then 14.7 g n-acetyl morpholine and 3.68 g o-xylene was added and the reactor was cooled to room temperature. Final viscosity was 13,834 cps at 23° C. using a DVII Brookfield viscometer.

Example 5

(MP-2-11): A 250 mL round bottom flask equipped with mechanical stirrer, condenser, and nitrogen bubbler was charged with: 49 g n-acetyl morpholine, 18.9 g diethylacetamide, 1.3 g o-xylene, 29.7 g methylene diphenyl diisocyanate, and 23.6 g trimellitic anhydride. The reaction was heated to 90° C. for 2 hours. The reaction temperature was then heated to 130° C. for 3 hours and then 3.74 g n-acetyl morpholine was added and the reactor was cooled to 60° C. Then 14.7 g acetone was added dropwise, and the reactor was cooled to room temperature. Final viscosity was 3,076 cps at 23° C. using a DVII Brookfield viscometer.

Example 6

(KM38): A 500 mL round bottom flask equipped with mechanical stirrer, condenser, and nitrogen bubbler was charged with: 121 g n-acetyl morpholine, 52.9 g methylene diphenyl diisocyanate, and 40.92 g trimellitic anhydride. The reaction was heated to 88° C. for 3 hours. The reaction temperature was then heated to 120° C. until the quench viscosity reached 1680 cps (about 2.5 hours) and then 41.81 g n-formyl morpholine and 41.81 g o-xylene was added to quench the reaction. The reactor was cooled to room temperature. Final viscosity was 8573 cps at 23° C. using a DVII Brookfield viscometer.

Example 7

(JES-4-21): 50.27 g methylene diphenyl diisocyanate, 38.62 g trimellitic anhydride, and 206.56 g n-formyl morpholine were charged to a 400 mL beaker. The reaction mixture was heated to 80° C. until approximately 1 equivalent of $CO_2$, by weight loss, was evolved. The reaction was then heated to 130° C. until the quench viscosity reached 730 cps and then 41.51 g. additional n-formyl morpholine was added to quench the reaction. The reactor was cooled to room temperature. Final solids content was analyzed to be 26.02% and final viscosity was 10264 cps (using a DVII Brookfield viscometer.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A process for producing polyamideimide comprising using at least one aprotic dialkylamide solvent, wherein the at least one aprotic dialkylamide solvent includes diacetylpiperazine or N,N-diisopropylacetamide;
   wherein a ratio of the at least one aprotic dialkylamide solvent to other process co-solvents is between 19:1 and 1:1; and
   wherein the other process co-solvents are selected from the group consisting of water, o-xylene, triethylamine, dimethylethanolamine, morpholine, N-methylmorpholine, acetone, trimethylamine, tripropylamine, diethylamine, diisopropylamine, and caprolactam.

2. The process of claim 1 wherein the at least one aprotic dialkylamide solvent further comprises N-acetyl morpholine.

3. The process of claim 1 wherein the at least one aprotic dialkylamide solvent further comprises diethyl acetamide.

4. The process of claim 1 wherein the at least one aprotic dialkylamide solvent further comprises di-N-propyl acetamide.

5. The process of claim 1 wherein the at least one aprotic dialkylamide solvent further comprises N-formyl morpholine.

6. The process of claim 1 wherein the at least one aprotic dialkylamide solvent further comprises di-N-butylacetamide.

7. The process of claim 1 wherein the at least one aprotic dialkylamide solvent further comprises N-propionyl morpholine.

8. A polyamideimide product produced by the process of claim 1.

9. The process of claim 1, further comprising:
   reacting a diisocyanate with a trimellitic anhydride (TMA) in the presence of the at least one aprotic dialkylamide solvent.

10. The method of claim 1, wherein a molar ratio of a total amount of the at least one aprotic dialkylamide solvent to a total amount of other process co-solvents is approximately 78:22.

11. The method of claim 1, wherein the diisocyanate is 4,4'-methylene diphenyldiisocyanate (MDI).

12. A polyamideimide product produced by the process of claim 9.

13. A process for producing polyamideimide comprising using at least one aprotic dialkylamide solvent, wherein the at least one aprotic dialkylamide solvent includes N-acetyl morpholine, diethyl acetamide, di-N-propyl acetamide, N-formyl morpholine, diacetylpiperazine, N,N-diisopropylacetamide, di-N-butylacetamide or N-propionyl morpholine;
   wherein a molar ratio of the at least one aprotic dialkylamide solvent to other process co-solvents is approximately 78:22; and
   wherein the other process co-solvents are selected from the group consisting of water, o-xylene, triethylamine, dimethylethanolamine, morpholine, N-methylmorpholine, acetone, trimethylamine, tripropylamine, diethylamine, diisopropylamine, and caprolactam.

* * * * *